United States Patent
Zhang

(10) Patent No.: US 10,984,570 B2
(45) Date of Patent: Apr. 20, 2021

(54) PICTURE MARKING METHOD AND APPARATUS, COMPUTER DEVICE, AND COMPUTER READABLE STORAGE MEDIUM

(71) Applicant: BOE TECHNOLOGY GROUP CO., LTD., Beijing (CN)

(72) Inventor: Zhe Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/561,270

(22) Filed: Sep. 5, 2019

(65) Prior Publication Data

US 2020/0219299 A1 Jul. 9, 2020

(30) Foreign Application Priority Data

Jan. 4, 2019 (CN) .......................... 201910007047.3

(51) Int. Cl.
*G06T 11/60* (2006.01)
*G06F 3/0485* (2013.01)
(Continued)

(52) U.S. Cl.
CPC ............ *G06T 11/60* (2013.01); *G06T 3/0006* (2013.01); *G06F 3/0485* (2013.01); *G06F 3/04845* (2013.01); *G06T 2210/41* (2013.01)

(58) Field of Classification Search
CPC ... G06T 11/60; G06T 3/0006; G06T 2210/41; G06F 3/04845; G06F 3/0485
See application file for complete search history.

(56) References Cited

U.S. PATENT DOCUMENTS

2010/0050110 A1\* 2/2010 Hughes ................. G16H 40/63
715/781
2010/0201707 A1 8/2010 Rasmussen et al.
(Continued)

FOREIGN PATENT DOCUMENTS

CN 103425690 A 12/2013
CN 106776939 A 5/2017
(Continued)

OTHER PUBLICATIONS

Chinese Office Action dated May 22, 2020, from application No. 201910007047.3.

(Continued)

*Primary Examiner* — Jitesh Patel
(74) *Attorney, Agent, or Firm* — Thomas Horstemeyer, LLP

(57) ABSTRACT

A picture marking method includes dividing a display layer into a window layer to which a display window belongs, a view layer to which a picture belongs, and a mark layer to which a mark belongs. The window layer, the view layer and the mark layer are overlapped with each other. The method includes adjusting a size of the picture according to a size of the display window, and customizing a first mode of the picture in response to a user operation. The method includes customizing an attribute value of the mark and a second mode of the mark in response to the user operation, and deploying the mark. The second mode includes a response mode synchronous with the first mode. The method includes capturing the user operation.

17 Claims, 8 Drawing Sheets

(51) Int. Cl.
*G06T 3/00* (2006.01)
*G06F 3/0484* (2013.01)

(56) References Cited

U.S. PATENT DOCUMENTS

| | | | | |
|---|---|---|---|---|
| 2013/0103446 A1* | 4/2013 | Bragdon | ............. | G06Q 10/109 |
| | | | | 705/7.15 |
| 2014/0047313 A1* | 2/2014 | Patterson | ............. | G06F 16/248 |
| | | | | 715/230 |
| 2015/0160844 A1* | 6/2015 | Kim | ..................... | G06F 19/321 |
| | | | | 715/798 |
| 2019/0076125 A1* | 3/2019 | Roger | ................... | G06F 19/321 |

FOREIGN PATENT DOCUMENTS

| CN | 106971370 A | 7/2017 |
|---|---|---|
| CN | 107256259 A | 10/2017 |
| CN | 107369197 A | 11/2017 |
| CN | 107451406 A | 12/2017 |
| CN | 108320313 A | 7/2018 |
| CN | 109101150 A | 12/2018 |

OTHER PUBLICATIONS

Second Office Action for CN Patent Application No. 2019100070473 dated Feb. 8, 2021.

* cited by examiner the coordinates of the starting and ending touch points, and their spacing, are obtained by the corresponding method in MotionEvent, — S701 four points which are the upper coordinate, the left coordinate, the lower coordinate, and the right coordinate relative to the current picture of the window is obtained — S702 the newly added pitch is assigned to the four points, — S703 comparing the four-point coordinates with the picture boundary coordinates to detect the out-of-bounds — S704 moving pictures and markers corresponding to the detecting results — S705

FIG. 7

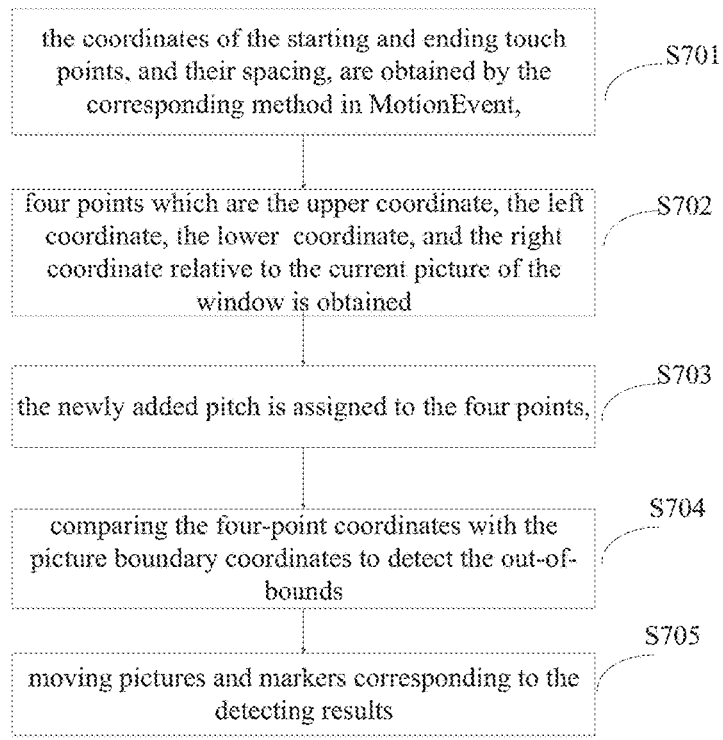

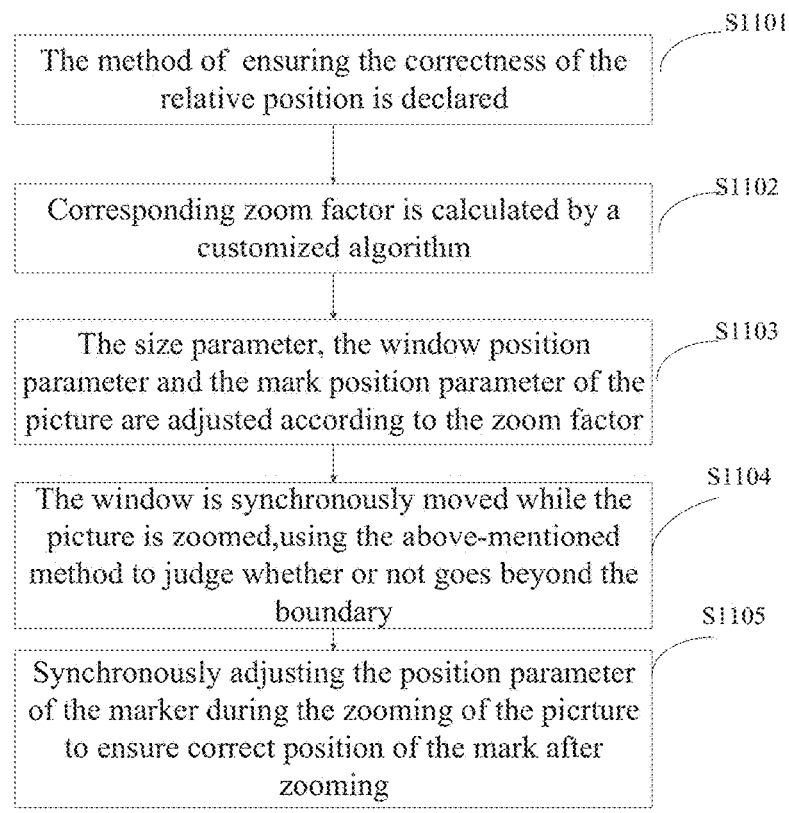
FIG. 11
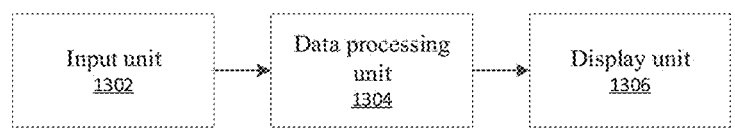
FIG. 12
| Input unit 1302 | → | Data processing unit 1304 | → | Display unit 1306 |
FIG. 13

PICTURE MARKING METHOD AND APPARATUS, COMPUTER DEVICE, AND COMPUTER READABLE STORAGE MEDIUM

CROSS REFERENCE

The present application claims priority to Chinese Patent Application No. 201910007047.3 and filed Jan. 4, 2019, the entire contents of which are incorporated herein by reference.

TECHNICAL FIELD

The present disclosure relates to the field of display technologies, and more particularly, to a picture marking method and apparatus, a computer device, and a computer readable storage medium.

BACKGROUND

In many application scenarios, it is needed to mark on pictures, and relative locations of the marks should be maintained correct while moving or dragging the pictures. For example, contents are marked on some medical pictures, or buildings are marked in sand table maps during district planning, etc.

According to some existing methods for dragging the View control, marks are directly placed on pictures. In the process of sliding or zooming the pictures, it is impossible to guarantee that the relative location of the marks is constant, and it is impossible to implement an interaction between users and marks or mark areas in the pictures, for example, to touch and click to link other contents, etc. In addition, it is impossible to support custom or customized scenarios.

In addition, there are some similar functional implementations on some map controls. However, firstly, maps are geographical coordinate systems instead of pictures, and the processing and use of the geographical coordinate systems are not in the same scenario as the pictures. Secondly, some existing map Software Development Kits (SDKs) are encrypted and encapsulated and have fixed standards no matter whether they are in data form or presentation form, thus developers cannot make customized modification on this basis.

Therefore, it is desirable to provide a more flexible and efficient picture marking method and apparatus, a computer device, and a computer readable storage medium.

It is to be noted that the above information disclosed in this Background section is only for enhancement of understanding of the background of the present disclosure and therefore it may contain information that does not form the prior art that is already known to a person of ordinary skill in the art.

SUMMARY

The present disclosure provides a picture marking method and apparatus, a computer device, and a computer readable storage medium.

A first aspect of the present disclosure provides a picture marking method. The method includes dividing a display layer into a window layer to which a display window belongs, a view layer to which a picture belongs, and a mark layer to which a mark belongs. The window layer, the view layer and the mark layer are overlapped with each other. The method includes adjusting a size of the picture according to a size of the display window, and customizing a mode of the picture in response to a user operation. The method includes customizing an attribute value of the mark and a mode of the mark in response to the user operation, and deploying the mark. The mode of the mark in response to the user operation includes a response mode synchronous with respect to the mode of the picture in response to the user operation. The method includes capturing the user operation, such that the picture and the mark respond to the user operation.

According to the picture marking method provided by the first aspect of the present disclosure, through a three-layer View overlapping manner, dynamically acquired data may be flexibly displayed on a picture using a mark, and the relative location and the size of the mark may be ensured to be correct according to a pixel coordinate system of the picture. The picture marking method provided by the present disclosure may be implemented in any open source system such as an Android system, and a solution is provided in the process of displaying the picture to make some operations in cooperation with the mark or to mark according to data dynamically generated in certain situations.

In an example arrangement, the attribute value of the mark includes a style of the mark, a size of the mark, and a deployment location of the mark in a pixel coordinate system of the picture.

In an example arrangement, the style and the size of the mark include the style and the size of a mark for different scene requirements.

In an example arrangement, the mode of the mark in response to the user operation further includes a mode of the mark in response to the user operation for the deployment location of the mark and/or a mode of the mark in response to a user operation for an external control associated with the mark.

In an example arrangement, the mode of the mark in response to the user operation for the deployment location of the mark includes a mode of a mark for different scene requirements in response to the user operation for the deployment location of the mark. The mode of the mark in response to the user operation for the external control associated with the mark includes a mode of a mark for different scene requirements in response to the user operation for the external control associated with the mark.

In an example arrangement, the response mode synchronous with respect to the mode of the picture in response to the user operation is implemented based on a pixel coordinate of the picture.

In an example arrangement, the mode of the picture in response to the user operation includes rotating, zooming, panning, and tilting.

In an example arrangement, the mode of the mark in response to the user operation for the deployment location of the mark and the mode of the mark in response to the user operation for the external control associated with the mark includes zooming, panning, and exhibiting information.

In an example arrangement, the method further includes determining whether the mark goes beyond a boundary of the picture according to the size of the mark and the deployment location of the mark in the pixel coordinate system of the picture when the mark is deployed, and hiding the mark if the determination result is yes. By using this implementation, it may be ensured that the size of the initial picture is matched to the size of the display window, and the size of the initial picture is not reduced due to the presence of the mark. A mark may be displayed if the pixel coordinate system of a picture is extended large enough such that a previously hidden mark may be displayed in the process when the picture and the mark are zoomed.

In an example arrangement, the method further includes determining whether the display window goes beyond a boundary of the picture when the mode of the picture in response to the user operation is the zooming or the panning, and issuing an out-of-boundary prompt if the determination result is yes. By using this implementation, it may be ensured that out-of-boundary is avoided when the display window reaches the boundary in the process of zooming or panning the picture or the mark, such that it is avoided such a case that only a large amount of white space can be seen after the picture slides out of the boundary due to unrestricted and boundaryless sliding of the picture, etc. Meanwhile, it is avoided such a case that the zoomed mark may likely go beyond the boundary of the picture, etc.

In an example arrangement, determining whether the display window goes beyond a boundary of the picture when the mode of the picture in response to the user operation is the zooming or the panning, and issuing an out-of-boundary prompt if the determination result is yes further includes: obtaining boundary point coordinates of the picture in the pixel coordinate system of the picture in upper, lower, left and right directions of the picture when the size of the picture is adjusted according to the size of the display window; obtaining boundary point coordinates of the display window in the pixel coordinate system of the picture in upper, lower, left and right directions after the zooming or panning response is made to the user operation; and comparing the boundary point coordinate values of the picture with the boundary point coordinate values of the display window in corresponding directions, and issuing an out-of-boundary prompt if it is determined, according to the comparison result, that the display window goes beyond the boundary of the picture in at least one direction.

In an example arrangement, when the mode of the picture in response to the user operation is the zooming, the mark is zoomed according to a zoom factor of the picture, and the deployment location of the mark in the pixel coordinate system of the picture is adjusted.

A second aspect of the present disclosure provides a picture marking apparatus for performing the method provided by the first aspect of the present disclosure, which includes a displayer, a data processor, and an input device.

The data processor is configured to divide a display layer of the displayer into a window layer to which a display window belongs, a view layer to which a picture belongs, and a mark layer to which a mark belongs. The window layer, the view layer and the mark layer are overlapped with each other. The data processor is configured to adjust a size of the picture according to a size of the display window, and customize a mode of the picture in response to a user operation. The data processor is configured to customize an attribute value of the mark and a mode of the mark in response to the user operation, and deploy the mark, the mode of the mark in response to the user operation including a response mode synchronous with respect to the mode of the picture in response to the user operation. The data processor is configured to add an operation monitor in the window layer for the view layer to capture the user operation received by the input device, such that the picture and the mark respond to the user operation.

A third aspect of the present disclosure provides a computer device, which includes a memory, a processor, and a computer program stored on the memory and executable on the processor. When the processor executes the computer program, the method provided by the first aspect of the present disclosure can be implemented.

A fourth aspect of the present disclosure provides a computer readable storage medium, which stores a computer program. When the computer program is executed by the processor, the method provided by the first aspect of the present disclosure can be implemented.

BRIEF DESCRIPTION OF THE DRAWINGS

Further detailed description of specific arrangements of the present disclosure is made below with reference to the accompanying drawings, in which

FIG. 7 illustrates a detailed flow chart of detecting whether it is out of bounds provided by an arrangement of the present disclosure.

FIG. 8-10 illustrate the pseudo code employed in the blocks shown in FIG. 7

FIG. 11 illustrates a detailed flow chart of the method for ensuring the relative position of the mark by calculating when the picture is zoomed by two fingers provided by an arrangement of the present disclosure.

FIG. 12 illustrates the pseudo code employed in the block shown in FIG. 11.

FIG. 13 illustrates a schematic diagram of a picture marking apparatus according to an arrangement of the present disclosure.

DETAILED DESCRIPTION

Figure 1:
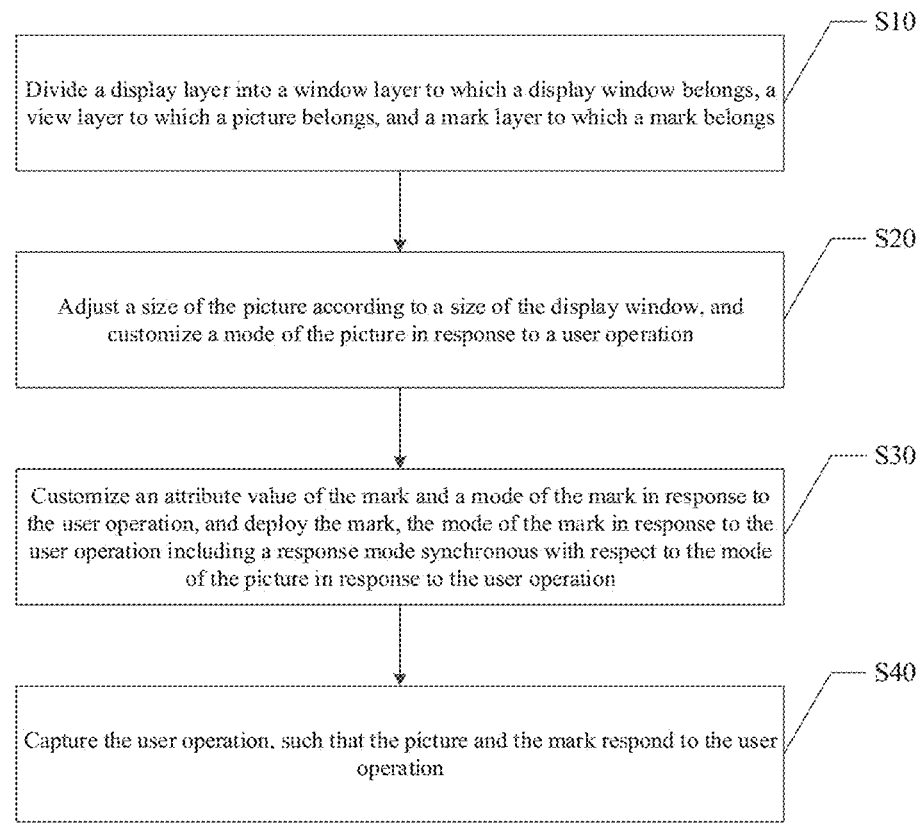
FIG. 1 illustrates a flowchart of a picture marking method according to an arrangement of the present disclosure.

To more clearly describe the present disclosure, the present disclosure is further described below with reference to arrangements and accompanying drawings. In these accompanying drawings, similar elements are represented by identical reference numerals. Those skilled in the art should understand that the following specific description is illustrative only and not restrictive, and should not be considered restrictive of the scope of protection of the present disclosure.

As shown in FIG. 1, an arrangement of the present disclosure provides a picture marking method, which includes following blocks:

Block S10: dividing a display layer into a window layer to which a display window belongs, a view layer to which a picture belongs, and a mark layer to which a mark belongs. The window layer, the view layer and the mark layer are overlapped with each other. The display layer includes an image displayed on the displayer.

Block S20: adjusting a size of the picture according to a size of the display window, and customizing a mode of the picture in response to a user operation.

Block S30: customizing an attribute value of the mark and a mode of the mark in response to the user operation, and deploying the mark. The mode of the mark in response to the user operation includes a response mode synchronous with respect to the mode of the picture in response to the user operation.

Block S40: capturing the user operation, such that the picture and the mark respond to the user operation.

Figure 2:
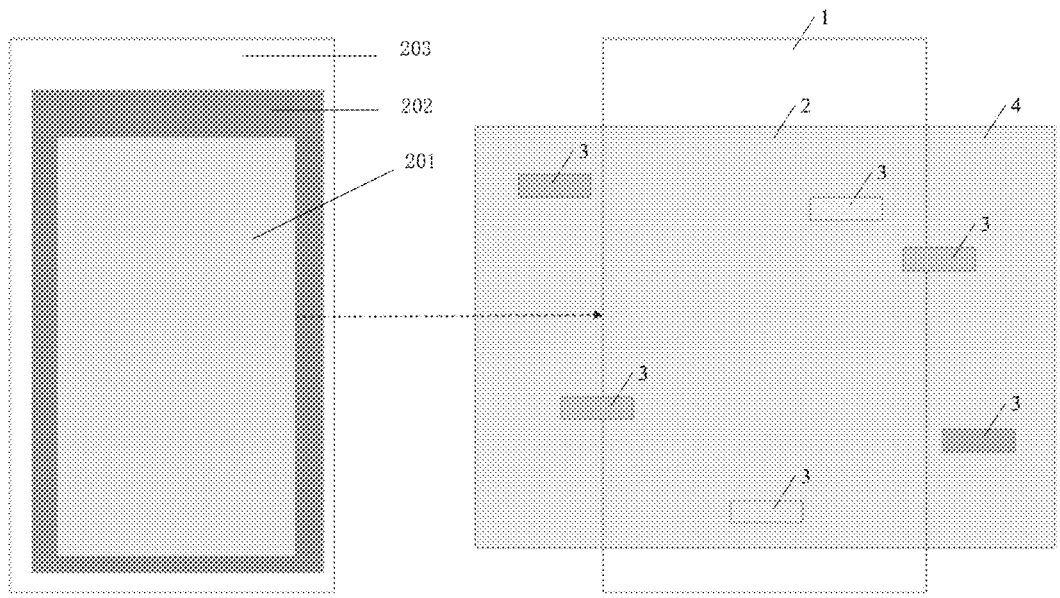
FIG. 2 illustrates a schematic constructional diagram for implementation of three-layer View overlapping.

According to the picture marking method provided by this arrangement, through a three-layer View, comprising DragContainer 201, Rootlayout 202 and DecorView 203, overlapping manner, according to DragContainer 1->DragView 2->Mark 3 as shown in FIG. 2, dynamically acquired data may be flexibly displayed on a picture 4 using the mark 3, and the relative location and the size of the mark 3 may be ensured to be correct according to a pixel coordinate system of the picture 4. In many application scenarios based on picture marking, this picture marking method is more flexible, efficient and practical. The picture marking method provided by this arrangement may be implemented in any open source system such as an Android system (corresponding codes may be designed for open APIs provided by Android developers based on Google), and a solution is provided in the process of displaying the picture to make some operations in cooperation with the mark or to mark according to data dynamically generated in certain situations. Compared with the existing methods, the picture marking method provided by this arrangement has higher scalability and flexibility.

Figure 3:
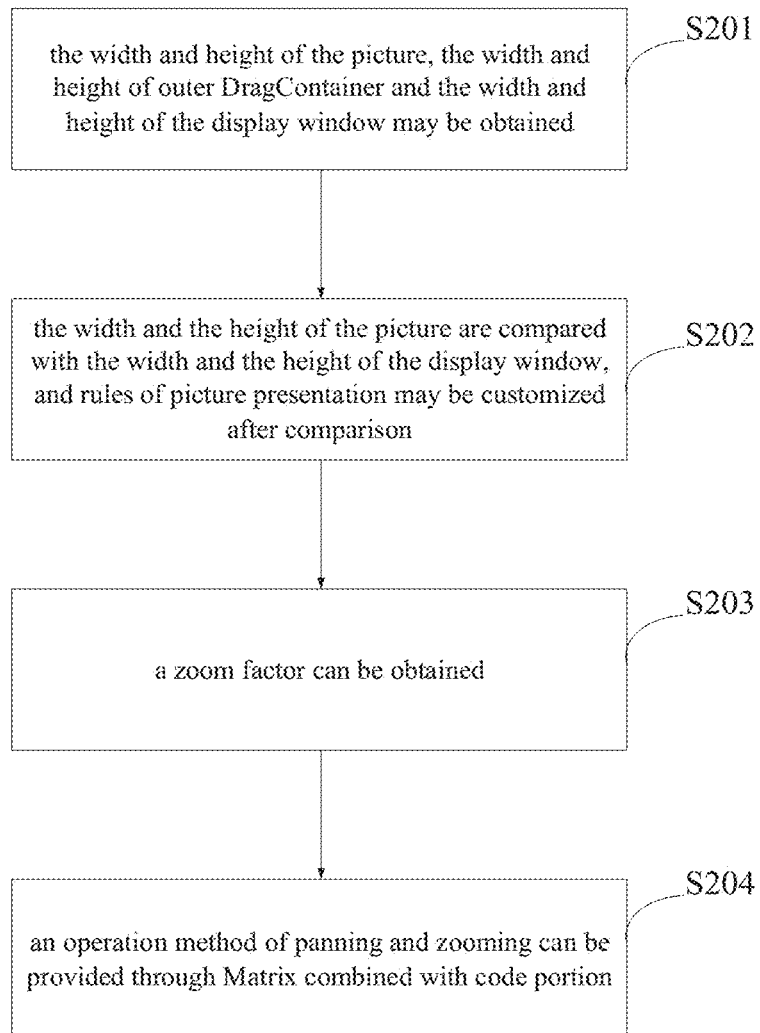
FIG. 3 illustrates a detailed flow chart of block S20 in FIG. 1.

In the Block S20 of adjusting the size of the picture according to the size of the display window and customizing a mode of the picture in response to the user operation, in some alternative implementation manners, can include the following blocks shown in FIG. 3.

According to adjusting the size of the picture according to the size of the display window, in a block S201, the width and height of the picture, the width and height of outer DragContainer and the width and height of the display window may be obtained. In a block S202, the width and the height of the picture are compared with the width and the height of the display window, and rules of picture presentation may be customized after comparison. In a block S203, a zoom factor can be obtained. For example, one side of the width (or height) of the picture and one side of the width (or height) of the display window may be zoomed, such that the width (or height) of the picture is equal to the width (or height) of the display window, while boundaries of the other sides may be obtained by means of a getScalForAdjustment( ) custom calculation to make it adaptive. At this moment, the size of the initial picture matched to the size of the display window and the zoom factor of the initial picture with respect to an original picture may be obtained.

In a block S204, an operation method of panning and zooming can be provided through Matrix combined with code portion. The mode of the picture in response to the user operation includes: rotating, zooming, panning, and tilting. The rotating, zooming, panning, and tilting of the picture may be operated using the methods provided by the Matrix class. In an Android system, the Matrix is a 3*3 matrix, which may be used for image manipulation. Each manipulation provides three manipulation manners, i.e., set, post and pre. In addition to the panning, the other three manipulations may specify a center point.

Figure 4:
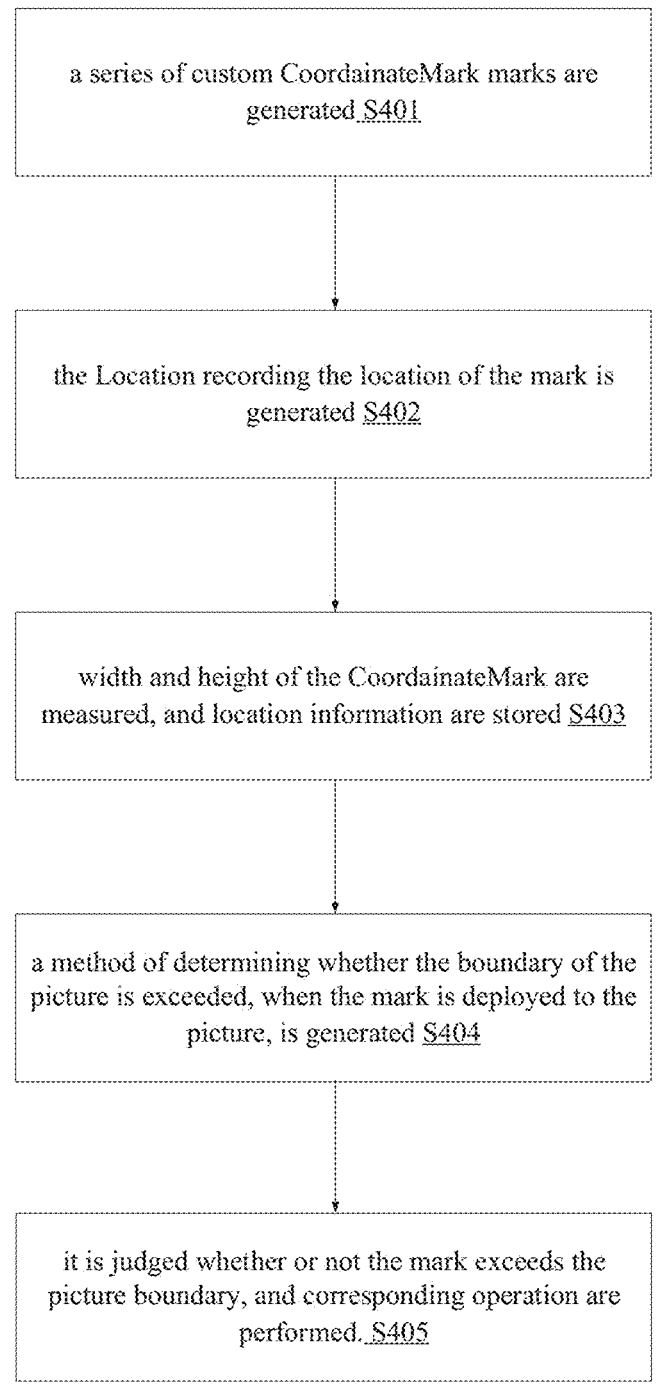
FIG. 4 illustrates a detailed flow chart of block S30 in FIG. 1.

In the Block S30 of customizing an attribute value of the mark and a mode of the mark in response to the user operation, and deploying the mark, the mode of the mark in response to the user operation including a response mode synchronous with respect to the mode of the picture in response to the user operation, in some alternative implementation manners, can include the following blocks shown in FIG. 4.

The attribute value of the mark includes a style of the mark, a size of the mark, and a deployment location of the mark in a pixel coordinate system of the picture. In a block of S401, a series of custom CoordainateMark marks are first generated according to a set of pixel coordinates of the picture.

In a block of S402, a Location is customized. Each Location corresponds to a Mark. In this way, the Location recording the location of the mark is generated.

In a block of S403, width and height of the CoordainateMark are measured, and location information and corresponding CoordainateMark objects are respectively stored in two Map data structures. When deploying a mark, the mark may be deployed according to the style of the mark, the size of the mark, and the deployment location of the mark in the pixel coordinate system of the picture. The response mode synchronous with respect to the mode of the picture in response to the user operation may be implemented based on a pixel coordinate of the picture, and a servo-action of the mark with respect to the picture is implemented by executing operation on the deployment location of the mark in the pixel coordinate system of the picture.

In a block of S404, a method of determining whether the boundary of the picture is exceeded, when the mark is deployed to the picture, is generated. In a block of S405, it is judged whether or not the mark exceeds the picture boundary, and corresponding operation are performed.

Figure 5:
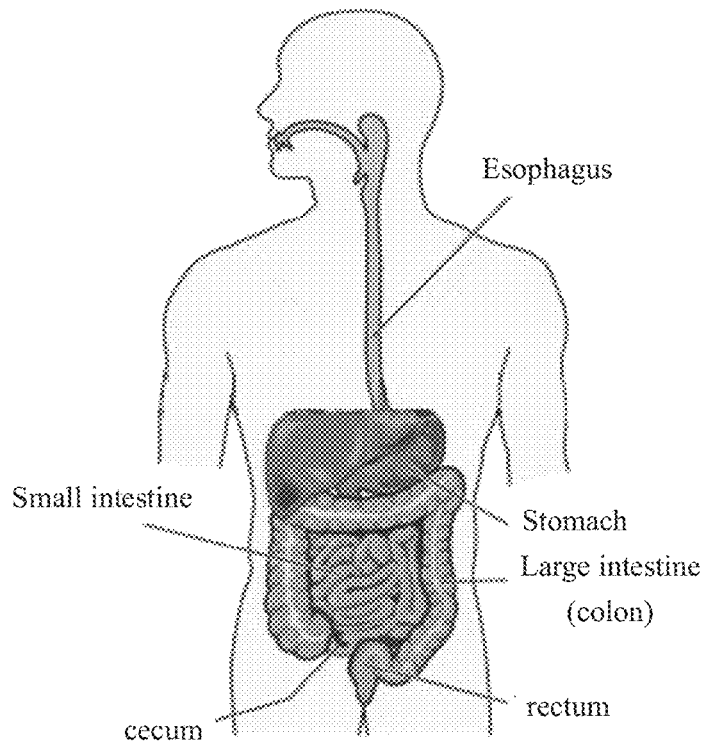
FIG. 5 illustrates an effect diagram for marking a medical picture.

The style and the size of the mark include the style and size of a mark for different scene requirements. Using this implementation, customized development of the mark may be implemented for specific scene requirements. The mark in this arrangement may be in any form such as texts or graphics, but is not merely limited to a mark on a picture or an example of a fixed shape like a book nail, a color, and a state. What is described is an abstract concept, i.e., the part that may be marked on the picture in different scenes or different requirements. For example, in sand table or topographic maps, some topographic and geomorphological marks are added. When some medical images are viewed with smartphones, the shapes, colors and states of viscera, bones or muscles (even the flow and state of blood vessel) may be marked by custom marks, for example, the marks of the internal organs in the medical pictures as shown in FIG. 5: "esophagus", "stomach" and the like. Customized development may be implemented in any scene where it is required to exhibit or mark details of the picture.

The mode of the mark in response to the user operation further includes a mode of the mark in response to the user operation for the deployment location of the mark and/or a mode of the mark in response to a user operation for an external control associated with the mark. Further, the mode of the mark in response to the user operation for the deployment location of the mark includes a mode of a mark for different scene requirements in response to the user operation for the deployment location of the mark, and the mode of the mark in response to the user operation for the external control associated with the mark includes a mode of a mark for different scene requirements in response to the user operation for the external control associated with the mark. By using this implementation manner, operation of the mark itself and linkage between the mark and the external control may be implemented. For example, in the development field of Android applications, in the process of picture presentation, often there is a need to make some custom mark on a picture and to trigger custom time (such as click jump) by marking. For example, in human medical pictures or images, it is necessary to mark some special points such as joints, acupoints, or the like, and some events may be triggered by clicking these marks. Similarly, in a sand table map depicting the terrain or a topographic map of a plot, there are also needs to achieve the objective of display or record through some marks. To complete this type of needs in the application, it is obviously not advisable to directly mark the picture itself, and it is impossible to perform an interaction between a user and a mark or mark area in the picture, for example, to touch and click to link other contents. The above needs may be achieved by using this implementation manner. For example, when a medical image is viewed with a smartphone, the shape, color and state of viscera, bone or muscle (even the flow and state of the blood vessel) may be represented by a custom mark. Click or touch operations may be associated with in the applications. In some topographic maps, sand table maps or indoor maps, by marking different areas, buildings or other facilities, it is also possible to perform rich interactions by applying the picture marking method to the pictures. Likewise, in the field of early childhood education, the picture marking method also may be used in puzzle applications. For example, pictures may be given to children, on which marks with different shapes, colors and states represent different things, and then the children are encouraged to place these things where they believe proper based on their own understanding. In this way, cognitive abilities of the children are increased.

The mode of the mark in response to the user operation for the deployment location of the mark and the mode of the mark in response to the user operation for the external control associated with the mark include: zooming, panning, and exhibiting information. The exhibiting information may be, for example, detailed information on prescription of text marks. The mode of the mark in response to the user operation for the external control associated with the mark may be written into a custom trigger event in advance for the mark, such that the external control is linked to the mark of the picture. For example, the mark is externally made into a displayable list class control for detailed display. By selecting the corresponding list item, the selected mark may be automatically moved to the center of the display window, and a specific method thereof may be providing corresponding method translateTo(x, y) of moving the display window in a window layer DragContainer, where x and y represent corresponding pixel coordinates. The principle is to first obtain the pixel coordinates coorX and coorY of the corresponding mark in the picture of a current zoom factor, the distances disX and disY indicating that the display window should move are calculated out based on four point coordinates (up, down, left, and right) of the display window, and the display window is moved to the designated location based on the disX and the disY.

When the mark is deployed, it is determined whether the mark goes beyond a boundary of the picture according to the size of the mark and the deployment location of the mark in the pixel coordinate system of the picture, and the mark is hidden if the determination result is yes. By using this implementation, it may be ensured that the size of the initial picture is matched to the size of the display window, and the size of the initial picture is not reduced due to the presence of the mark. A mark may be displayed if the pixel coordinate system of a picture is extended large enough such that a previously hidden mark may be displayed in the process when the picture and the mark are zoomed.

Figure 6:
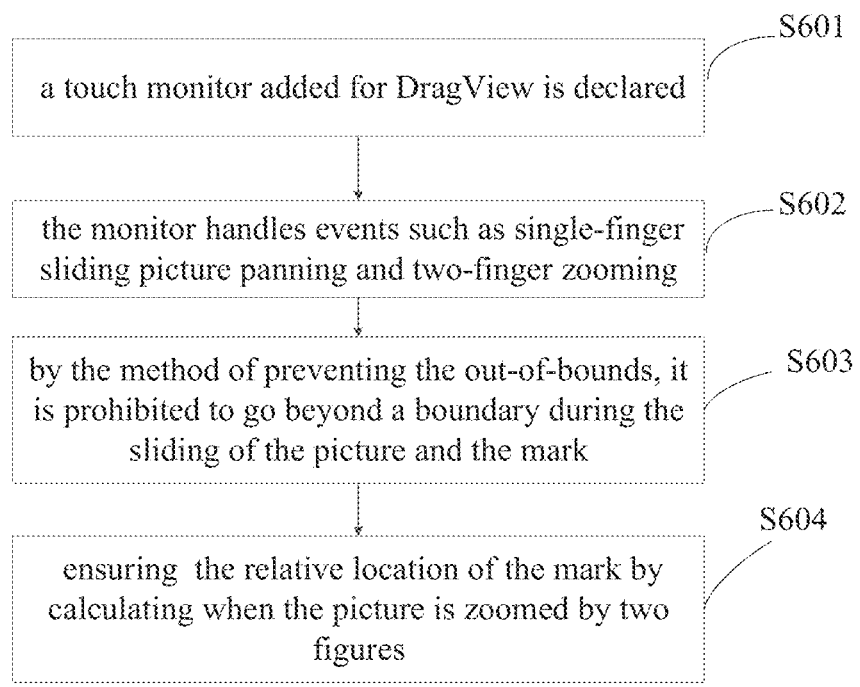
FIG. 6 illustrates a detailed flow chart of block S40 in FIG. 1.

In the Block S40 of capturing the user operation, such that the picture and the mark respond to the user operation, in some alternative implementation manners, can include the following blocks shown in FIG. 6.

In a block of S601, a touch monitor added for DragView is declared.

In a block of S602, the monitor handles events such as single-finger sliding picture panning and two-finger zooming. An operation monitor is added in the window layer for the view layer to capture the user operation, such that the picture and the mark respond to the user operation.

In a block of S603, by the method of preventing the out-of-bounds, it is prohibited to go beyond a boundary during the sliding of the picture and the mark.

It is determined whether the display window goes beyond a boundary of the picture when the mode of the picture in response to the user operation is the zooming or the panning, and an out-of-boundary prompt is issued if the determination result is yes. By using this implementation manner, it may be ensured that out-of-boundary is avoided when the display window reaches the boundary in the process of zooming or panning the picture or the mark, such that it is avoided such a case that only a large amount of white space can be seen after the picture slides out of the boundary due to unrestricted and boundaryless sliding of the picture, etc. Meanwhile, it is avoided such a case that the zoomed mark may likely go beyond the boundary of the picture, etc.

It is determined whether the display window goes beyond a boundary of the picture when the mode of the picture in response to the user operation is the zooming or the panning, and issuing an out-of-boundary prompt if the determination result is yes. The method further includes ensuring the relative size and the relative location of the mark when the picture is zoomed, by calculating, to be correct.

In a block of S604, obtaining boundary point coordinates of the picture in the pixel coordinate system of the picture in upper, lower, left and right directions of the picture when the size of the picture is adjusted according to the size of the display window (that is, boundary point coordinates of an initial picture in the pixel coordinate system of the picture in upper, lower, left and right directions of the picture are a y coordinate of the uppermost point, an x coordinate of the leftmost point, a y coordinate of the lowermost point, and an x coordinate of the rightmost point, respectively);

obtaining boundary point coordinates of the display window in the pixel coordinate system of the picture in upper, lower, left and right directions after the zooming or panning response is made to the user operation; and comparing the boundary point coordinate values of the picture with the boundary point coordinate values of the display window in corresponding directions, and issuing an out-of-boundary prompt if it is determined, according to the comparison result, that the display window goes beyond the boundary of the picture in at least one direction.

By using this implementation manner, compared with an existing method for determining a sliding boundary of View in a layout, where a single point or a single side of the x-axis or the y-axis is used to determine out-of-boundary, the picture marking method is more accurate in determination and smaller in error, and is more aligned with customization requirements.

The detailed process of detecting whether or not go beyond the boundary is shown in FIG. 7.

In a block of S701, the coordinates of the starting and ending touch points, and their spacing, are obtained by the corresponding method in MotionEvent, as shown by the pseudo code of FIG. 8.

In a block of S702, in the case where the scaling factor mentioned above is unchanged, the uppermost point y coordinate, the leftmost point x coordinate, the lowest pointy coordinate, and the rightmost point x coordinate relative to the current picture of the window (or mark) is obtained.

Figures 9, 10:
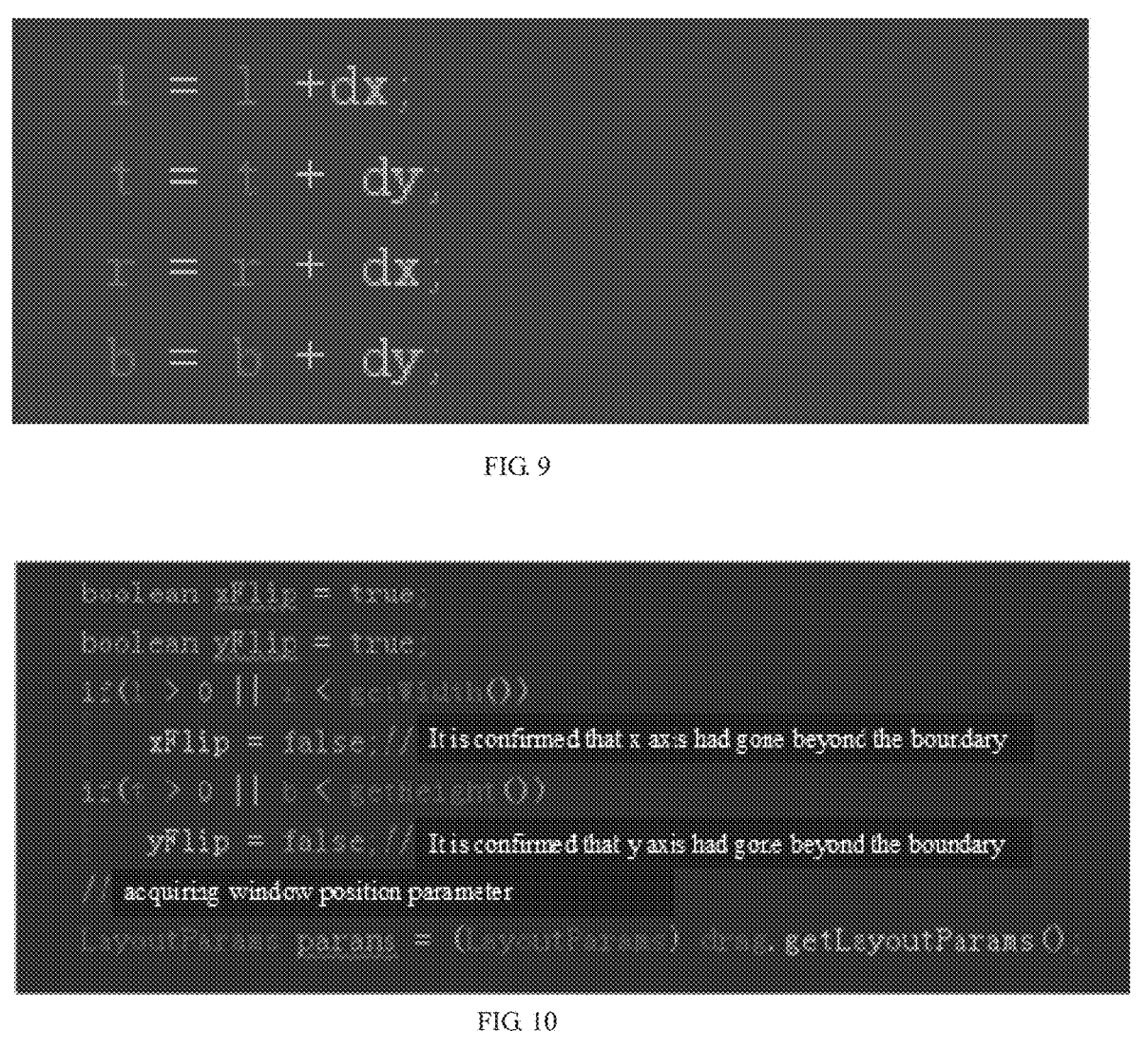

In a block of S703, the newly added pitch is assigned to the four points, as shown by the pseudo code of FIG. 9.

In a block of S704, the four points of the moved window are compared with the boundary coordinates of the picture itself. If the x-axis goes beyond the boundary, the Boolean variable xFlip is set to true. If the y-axis goes beyond the boundary, the Boolean variable yFlip is set to true. The pseudo code for detecting whether or not go beyond the boundary is as shown in FIG. 10.

In a block of S705, if the x-axis or the y-axis goes beyond the boundary, the picture in the DragView is moved according to the new coordinates of the four points of the window; if only one of the x-axis or the y-axis goes beyond the boundary, the picture is moved to the direction of the distance of the x-axis or the y-axis which is not beyond the boundary. If both the x-axis and the y-axis go beyond the boundary, the boundary position of the corresponding picture is moved directly, if it is exceeded, a prompt will pop up.

The detailed process of ensuring the relative size and the relative location of the mark when the picture is zoomed by two fingers is as shown in FIG. 11.

In a block of S1101, since there is no method for controlling the relative position after the picture is zoomed in the existing Android API method, in order to ensure the correctness of the relative position of the window and the mark after the picture is zoomed, the corresponding method is declared.

In a block of S1102, in the MotionEvent touch event, when the two-finger zoom (action is MODE_ZOOM) occurred, the distance difference between the starting point and ending point of the two-finger zoom is obtained, and the corresponding zoom factor is calculated by the following algorithm. It is described as followed.

```
int scale=(int)((endDis-startDis)/10f);
```

In a block of S1103, the scale calculated in block S1102 is regarded as a corresponding zoom factor after each zooming. The size parameter, the window position parameter and the mark position parameter of the picture are adjusted according to the zoom factor, as shown by the pseudo code in FIG. 12.

In a block of S1104, when the picture is zoomed, according to the previous zoom factor, the window is synchronously moved to the pixel coordinate position on the picture where the corresponding zoomed window should be located, which is the four points mentioned above. In the process of moving the window, use the above-mentioned method to judge whether or not goes beyond the boundary. If there is an out-of-boundary, the window will be stopped to move to the corresponding x-axis or y-axis before going beyond the boundary;

In a block of S1105, during the adjustment of the picture, the position parameter of a new mark is refreshed while is zoomed and adjusted. The relative position data of the mark is correspondingly adjusted according to the zoom factor, so that the relative correctness of the mark position is ensured.

When the mode of the picture in response to the user operation is the zooming, the mark is zoomed according to a zoom factor of the picture, and the deployment location of the mark in the pixel coordinate system of the picture is adjusted. By using this implementation manner, the relative size and the relative location of the mark may be ensured to be correct when the picture is zoomed. That is, in the view layer, it is implemented that the mark is moved and zoomed according to the pixel coordinate system and the zoom factor of the picture.

In summary, according to the picture marking method provided by this arrangement, by utilizing characteristics of a three-layer custom View and the display window, the picture and the mark may be automatically adapted to each other according to the size of the display window, and the part that extends beyond the display window may be supported. Furthermore, the picture may be moved by the user operation, meanwhile a mark outside the display window may be viewed, and the boundary of the moved picture may be automatically calculated. In the zooming process, it is supported that the pixel coordinate system of the picture where the mark is varies as the picture is zoomed in or out, and it is supported that a click event is set on the mark to implement the linkage between the mark and other external controls. This picture marking method is suitable for various scenarios where a mark is needed to be set on a picture and contents of the mark need to be edited, which is simple in implementation and quick in integration.

As shown in FIG. 13, another arrangement of the present disclosure provides a picture marking apparatus for performing the picture marking method, which includes a displayer (or display unit) 1306, a data processor (or data processing unit) 1304, and an input device (or input unit) 1302.

The displayer includes a displaying layer configured to display the picture. The input device is configured to receive the user operation. The data processor connected to the displayer and input device and configured to process the picture, so that the processed picture responds to the user operation.

The data processor is configured to: divide a display layer of the displayer into a window layer to which a display window belongs, a view layer to which a picture belongs, and a mark layer to which a mark belongs. The window layer, the view layer and the mark layer are overlapped with each other; adjust a size of the picture according to a size of the display window, and customize a mode of the picture in response to a user operation; customize an attribute value of the mark and a mode of the mark in response to the user operation, and deploy the mark. The mode of the mark in response to the user operation includes a response mode synchronous with respect to the mode of the picture in response to the user operation; and add an operation monitor in the window layer for the view layer to capture the user operation received by the input device, such that the picture and the mark respond to the user operation.

The displayer may be a display screen integrated in a terminal such as a smart phone or a tablet computer, and the input device may be a touch screen integrated in a terminal such as a smart phone or a tablet computer. The displayer and the input device may be integrated into an integrated structure. The data processor can be integrated into a separate processor chip connected to the display terminal such as a smart phone or a tablet computer, or can be a chip integrated with a processor of a terminal such as a smart phone or a tablet computer.

It is to be noted that the picture marking apparatus provided by this arrangement is similar to the above picture marking method in principles and working processes, and the above description of the picture marking method may serve as reference, and thus detailed description of the picture marking apparatus is omitted herein.

The picture marking apparatus provided by this arrangement may be implemented by a terminal such as a smart phone or a tablet computer, and the displayer and the input device may be integrated into a touchscreen of a terminal such as a smart phone or a tablet computer.

Figure 14:
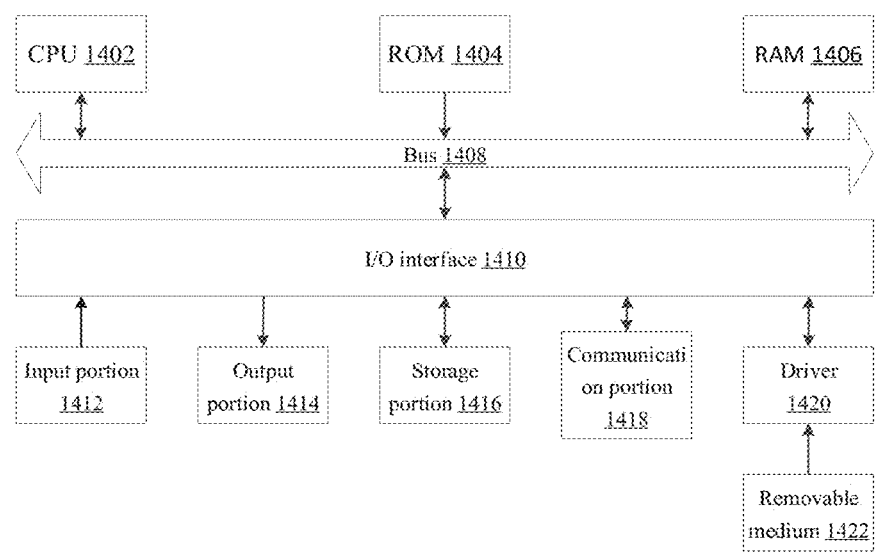
FIG. 14 illustrates a schematic structural diagram of a picture marking apparatus according to an arrangement of the present disclosure.

As shown in FIG. 14, a computer system configured to implement the picture marking apparatus provided by this arrangement includes a central processing unit (CPU) 1402, which may execute various appropriate actions and processes in accordance with a program stored in a read-only memory (ROM) 1404 or a program loaded into a random access memory (RAM) 1406 from a storage portion 1416. The RAM also stores various programs and data required by operations of the computer system. The CPU, the ROM and the RAM are coupled to each other through a bus 1408. An input/output (I/O) interface 1410 is also coupled to the bus.

The following components are coupled to the I/O interface: an input portion 1412 including a keyboard, a mouse etc.; an output portion 1414 including a liquid crystal display (LCD), and a speaker etc.; a storage portion including a hard disk and the like; and a communication portion 1418 including a network interface card, such as a LAN card and a modem, etc. The communication portion performs communication processes via a network, such as the Internet. A driver 1420 is also coupled to the I/O interface as required. A removable medium 1422, such as a magnetic disk, an optical disk, a magneto-optical disk, and a semiconductor memory, may be installed on the driver as required, to facilitate the retrieval of a computer program from the removable medium, and the installation thereof on the storage portion as needed.

In particular, according to this arrangement, the process described above with reference to the flow chart may be implemented in a computer software program. For example, this arrangement includes a computer program product, which includes a computer program that is tangibly embedded in a computer readable medium. The computer program includes program codes for executing the method as illustrated in the flow chart. In such an arrangement, the computer program may be downloaded and installed from a network via the communication portion, and/or may be installed from the removable medium.

The flowcharts and schematic diagrams in the accompanying drawings illustrate architectures, functions and operations that may be implemented according to the system, the method and the computer program product of this arrangement. In this regard, each block in the flowcharts or schematic diagrams may represent a module, a program segment, or a code portion. The module, the program segment, or the code portion includes one or more executable instructions for implementing the specified logical function. It should be noted that, in some alternative implementations, the functions denoted by the blocks may occur in a sequence different from the sequences shown in the Figures. For example, in practice, two blocks in succession may be executed, depending on the involved functionalities, substantially in parallel, or in a reverse sequence. It should also be noted that, each block in the schematic diagrams and/or the flowcharts and/or a combination of the blocks in the schematic diagrams and/or the flowcharts may be implemented by a dedicated hardware-based system executing specific functions or operations, or by a combination of a dedicated hardware and computer instructions. The units involved in this arrangement may be implemented by way of software or hardware.

In another aspect, this arrangement further provides a non-volatile computer storage medium. The non-volatile computer storage medium may be the non-volatile computer storage medium included in the apparatus in the above arrangements, or a stand-alone non-volatile computer storage medium which has not been assembled into a terminal. The above non-volatile computer storage medium stores one or more programs, when the one or more programs are executed by a device, causing the device to divide a display layer into a window layer to which a display window belongs, a view layer to which a picture belongs, and a mark layer to which a mark belongs. The window layer, the view layer and the mark layer are overlapped with each other. The one or more programs, when the one or more programs are executed by a device, causing the device to adjust a size of the picture according to a size of the display window, and customize a mode of the picture in response to a user operation. The one or more programs, when the one or more programs are executed by a device, causing the device to customize an attribute value of the mark and a mode of the mark in response to the user operation, and deploy the mark, wherein the mode of the mark in response to the user operation includes a response mode synchronous with respect to the mode of the picture in response to the user operation. The one or more programs, when the one or more programs are executed by a device, causing the device to add an operation monitor in the window layer for the view layer to capture the user operation, such that the picture and the mark respond to the user operation.

In the description of the present disclosure, it is to be noted that the orientations or positions represented by the terms of "up", "down" and the like are based on the orientations or positions as shown in the accompanying drawings, they are merely for ease of a description of the present disclosure and a simplified description instead of being intended to indicate or imply the apparatus or element to have a special orientation or to be configured and operated in a special orientation. Thus, they cannot be understood as limiting of the present disclosure. Unless specified or limited otherwise, terms "installation", "connecting" or "connection" should be understood in a broad sense, which may be, for example, a fixed connection, a detachable connection or integrated connection, a mechanical connection or an electrical connection, a direct connection or indirect connection by means of an intermediary, or internal communication between two components. For those of ordinary skill in the art, specific meanings of the above terms in the present disclosure may be understood based on specific circumstances.

It is also to be noted that a relational term (such as a first or a second) in the description of the present disclosure is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "may include a" do not exclude the fact that additional identical elements may exist in a process, a method, a merchandise or a device of these elements.

Apparently, the above arrangements of the present disclosure are only the examples for illustrating clearly the present disclosure and should not be interpreted as any limitations to the arrangements of the present disclosure. Various variations or modifications in different forms can be made for those of ordinary skills in the art based on the above description. Here all of the arrangements cannot be provided exhaustively. Obvious variations or modifications derived from the technical solution of the present disclosure still fall within the protection scope of the present disclosure.

What is claimed is:

1. A picture marking method, comprising:
    dividing a display layer into a window layer to which a display window belongs, a view layer to which a picture belongs, and a mark layer to which a mark belongs, wherein the window layer, the view layer and the mark layer are overlapped with each other;
    adjusting a size of the picture according to a size of the display window and customizing a first mode of the picture in response to a user operation;
    customizing an attribute value of the mark and a second mode of the mark in response to the user operation, the attribute value of the mark comprising a style of the mark, a size of the mark, and a deployment location of the mark in a pixel coordinate system of the picture, and deploying the mark, wherein the second mode of the mark customized in response to the user operation comprises a response mode synchronous with respect to the first mode of the picture in response to the user operation;
    determining whether the mark goes beyond a boundary of the picture according to the size of the mark and the deployment location of the mark in the pixel coordinate system of the picture when the mark is deployed;
    in an instance in which the mark goes beyond the boundary of the picture, hiding the mark; and
    capturing the user operation such that the picture and the mark respond to the user operation.

2. The picture marking method according to claim 1, wherein the style and the size of the mark comprise the style and size of a mark for different scene requirements.

3. The picture marking method according to claim 1, wherein the second mode of the mark customized in response to the user operation further comprises:
    a third mode of the mark customized in response to the user operation for the deployment location of the mark; and
    a fourth mode of the mark customized in response to the user operation for an external control associated with the mark.

4. The picture marking method according to claim 1, wherein the second mode of the mark customized in response to the user operation further comprises a third mode of the mark customized in response to the user operation for the deployment location of the mark.

5. The picture marking method according to claim 1, wherein the second mode of the mark customized in response to the user operation further comprises a fourth mode of the mark customized in response to the user operation for an external control associated with the mark.

6. The picture marking method according to claim 3, wherein:
    the second mode of the mark customized in response to the user operation for the deployment location of the mark comprises a fifth mode of a mark for different scene requirements customized in response to the user operation for the deployment location of the mark, and
    the fourth mode of the mark customized in response to the user operation for the external control associated with the mark comprises a sixth mode of a mark for different scene requirements customized in response to the user operation for the external control associated with the mark.

7. The picture marking method according to claim 1, wherein the response mode synchronous with respect to the first mode of the picture customized in response to the user operation is implemented based on the pixel coordinate of the picture.

8. The picture marking method according to claim 1, wherein the first mode of the picture customized in response to the user operation comprises: rotating, zooming, panning, and tilting.

9. The picture marking method according to claim 3, wherein the third mode of the mark customized in response to the user operation for the deployment location of the mark and the fourth mode of the mark customized in response to the user operation for the external control associated with the mark comprise: zooming, panning, and exhibiting information.

10. The picture marking method according to claim 8, further comprising:
    determining whether the display window goes beyond a boundary of the picture when the first mode of the picture in response to the user operation is the zooming or the panning, and
    in an instance in which the display window goes beyond the boundary of the picture, issuing an out-of-boundary prompt.

11. The picture marking method according to claim 10, wherein determining whether the display window goes beyond a boundary of the picture when the first mode of the picture in response to the user operation is the zooming or the panning, and issuing the out-of-boundary prompt further comprises:
    obtaining boundary point coordinates of the picture in the pixel coordinate system of the picture in upper, lower, left and right directions of the picture when the size of the picture is adjusted according to the size of the display window;
    obtaining boundary point coordinates of the display window in the pixel coordinate system of the picture in upper, lower, left and right directions after the zooming or panning response is made in response to the user operation; and
    performing a comparison of the boundary point coordinate values of the picture with the boundary point coordinate values of the display window in corresponding directions, and issuing the out-of-boundary prompt in response to a determination, according to a result of the comparison, that the display window goes beyond the boundary of the picture in at least one direction.

12. The picture marking method according to claim 8, wherein, when the first mode of the picture customized in response to the user operation is the zooming, the mark is zoomed according to a zoom factor of the picture and a deployment location of the mark in the pixel coordinate system of the picture is adjusted.

13. The picture marking method according to claim 1, wherein the picture marking method is implemented by a computing device, the computing device comprising a memory, at least one hardware processor, and a computer program stored in the memory, wherein the picture marking method is implemented through execution of the computer program by the at least one hardware processor.

14. A picture marking apparatus comprising:
   display device comprising a display layer configured to display a picture;
   at least one hardware processor; and
   program instructions stored in memory and executable by the at least one hardware processor that, when executed, direct the at least one hardware processor to:
      divide the display layer of the display device into a window layer to which a display window belongs, a view layer to which a picture belongs, and a mark layer to which a mark belongs, wherein the window layer, the view layer, and the mark layer are overlapped with each other;
      adjust a size of the picture according to a size of the display window and customize a first mode of the picture in response to a user operation;
      customize an attribute value of the mark and a second mode of the mark in response to the user operation, the attribute value of the mark comprising a style of the mark, a size of the mark, and a deployment location of the mark in a pixel coordinate system of the picture, and deploy the mark, wherein the second mode of the mark customized in response to the user operation comprises a response mode synchronous with respect to the first mode of the picture in response to the user operation;
      determine whether the mark goes beyond a boundary of the picture according to the size of the mark and the deployment location of the mark in the pixel coordinate system of the picture when the mark is deployed;
      in an instance in which the mark goes beyond the boundary of the picture, hide the mark; and
      add an operation monitor in the window layer for the view layer to capture the user operation received by an input device such that the picture and the mark respond to the user operation.

15. The picture marking apparatus according to claim 14, wherein the style and the size of the mark comprise the style and size of a mark for different scene requirements.

16. The picture marking apparatus according to claim 14, wherein the second mode of the mark customized in response to the user operation further comprises a third mode of the mark customized in response to the user operation for the deployment location of the mark and a fourth mode of the mark customized in response to a user operation for an external control associated with the mark.

17. A non-transitory computer-readable storage medium having a computer program stored thereon that, when executed by at least one hardware processor, directs the at least one hardware processor to perform a method comprising:
   dividing a display layer into a window layer to which a display window belongs, a view layer to which a picture belongs, and a mark layer to which a mark belongs, wherein the window layer, the view layer, and the mark layer are overlapped with each other;
   adjusting a size of the picture according to a size of the display window and customizing a first mode of the picture in response to a user operation;
   customizing an attribute value of the mark and a second mode of the mark in response to the user operation, the attribute value of the mark comprising a style of the mark, a size of the mark, and a deployment location of the mark in a pixel coordinate system of the picture, and deploying the mark, wherein the second mode of the mark customized in response to the user operation comprising comprises a response mode synchronous with respect to the first mode of the picture in response to the user operation;
   determining whether the mark goes beyond a boundary of the picture according to the size of the mark and the deployment location of the mark in the pixel coordinate system of the picture when the mark is deployed;
   in an instance in which the mark goes beyond the boundary of the picture, hiding the mark; and
   capturing the user operation such that the picture and the mark respond to the user operation.

* * * * *